United States Patent
Zhao (10) Patent No.: US 10,432,557 B2
(45) Date of Patent: Oct. 1, 2019

(54) NETWORK DEVICE

(71) Applicant: New H3C Technologies Co., Ltd, Hangzhou (CN)

(72) Inventor: Zhiyu Zhao, Beijing (CN)

(73) Assignee: NEW H3C TECHNOLOGIES CO., LTD, Hangzhou (CN)

( * ) Notice: Subject to any disclaimer, the term of this patent is extended or adjusted under 35 U.S.C. 154(b) by 0 days.

(21) Appl. No.: 15/753,471

(22) PCT Filed: Aug. 25, 2016

(86) PCT No.: PCT/CN2016/096633
§ 371 (c)(1),
(2) Date: Feb. 19, 2018

(87) PCT Pub. No.: WO2017/032317
PCT Pub. Date: Mar. 2, 2017

(65) Prior Publication Data
US 2018/0241698 A1 Aug. 23, 2018

(30) Foreign Application Priority Data
Aug. 25, 2015 (CN) .......................... 2015 1 0524605

(51) Int. Cl.
*H04L 12/931* (2013.01)
*H04L 12/24* (2006.01)
(Continued)

(52) U.S. Cl.
CPC .......... *H04L 49/40* (2013.01); *G06F 11/2002* (2013.01); *G06F 13/385* (2013.01);
(Continued)

(58) Field of Classification Search
CPC .... H04W 49/40; H04W 49/253; H04L 45/38; H04L 41/0806; G06F 13/385
See application file for complete search history.

(56) References Cited

U.S. PATENT DOCUMENTS 6,791,554 B1 * 9/2004 Mergard .................. G06T 1/20
345/519
7,376,760 B1 * 5/2008 Ivchenko ........... G05B 19/4183
702/108
(Continued)

FOREIGN PATENT DOCUMENTS

CN     1540933    10/2004
CN     1909559    2/2007
(Continued)

OTHER PUBLICATIONS

International Search Report issued in International Application No. PCT/CN2016/096633, dated Dec. 1, 2016.
(Continued)

*Primary Examiner* — Rasheed Gidado
(74) *Attorney, Agent, or Firm* — Norton Rose Fulbright US LLP (57) ABSTRACT

A network device may include a first forwarding board, a second forwarding board and an interface board. The interface board may include a control apparatus and a network interface chip. The control apparatus may form a first upstream packet flow which is sent to the first forwarding board via a first I/O bus and a second upstream packet flow which is sent to the second forwarding board via a second I/O bus using data packets received through the network interface chip from the exterior of the network device. The control apparatus may selectively connect one of a first downstream packet flow and a second downstream packet flow to the network interface chip through the network interface bus according to an active/standby state of the first forwarding board and the second forwarding board, wherein the first downstream packet flow is processed by the first forwarding board and received through the first I/O bus and the second downstream packet flow is processed by the second forwarding board and received through the second I/O bus.

10 Claims, 7 Drawing Sheets

(51) Int. Cl.
  *G06F 13/38* (2006.01)
  *H04L 12/721* (2013.01)
  *H04L 12/937* (2013.01)
  *G06F 13/40* (2006.01)
  *G06F 11/20* (2006.01)
(52) U.S. Cl.
  CPC ...... *G06F 13/4022* (2013.01); *H04L 41/0806* (2013.01); *H04L 45/38* (2013.01); *H04L 49/253* (2013.01); *G06F 2213/0026* (2013.01)

(56) References Cited

U.S. PATENT DOCUMENTS

| | | | | |
|---|---|---|---|---|
| 7,382,724 | B1* | 6/2008 | Woo | H04L 1/22 370/219 |
| 8,527,666 | B2* | 9/2013 | Brownlow | G06F 13/385 710/10 |
| 2008/0282013 | A1* | 11/2008 | Chen | G06F 13/409 710/306 |
| 2015/0269109 | A1* | 9/2015 | Spry | G06F 13/4221 710/105 |

FOREIGN PATENT DOCUMENTS

| | | |
|---|---|---|
| CN | 101977139 | 9/2012 |
| CN | 104283718 | 1/2015 |
| CN | 104410502 | 3/2015 |
| EP | 1309135 | 5/2003 |
| JP | 2003-032284 | 1/2003 |
| JP | 2014-195147 | 10/2014 |
| JP | 2015-154127 | 8/2015 |

OTHER PUBLICATIONS

Supplementary Search Report issued in Corresponding European Patent Application No. 16838575, dated Nov. 28, 2019.
Office Action dated Jan. 28, 2019 in corresponding Chinese Patent Application No. 201510524605.5, dated (Machine Translation).
Office Action issued in corresponding Japanese Patent Application No. 2018-528374, dated Mar. 5, 2019. (Machine Translation).
Notice of Grant issued in Corresponding Japanese Patent Application No. 2018-528374, dated Jun. 6, 2019. (English Translation).

* cited by examiner

NETWORK DEVICE

This application is a national phase under 35 U.S.C. § 371 of International Application No. PCT/CN2016/096633, filed Aug. 25, 2016, which claims the benefit of priority to Chinese Patent Application No. 201510524605.5, filed Aug. 25, 2015. The contents of each of the above-referenced applications are incorporated into the present application by reference.

BACKGROUND

A network device may include a forwarding board and an interface board. A plurality of forwarding boards may be deployed in a network device in a manner of active/standby redundancy to improve the reliability of forwarding.

When active/standby switching of forwarding boards is needed, I/O buses between the interface board and the forwarding boards may be physically switched over. That is, a physical connection of an I/O bus between the interface board and a forwarding board which is downgraded to be a standby forwarding board may be disconnected, and a physical connection of an I/O bus between the interface board and a forwarding board which is newly-promoted to be an active forwarding board may be newly established. The newly-promoted active forwarding board may also perform initiate configurations to the I/O bus having the newly established physical connection.

BRIEF DESCRIPTION OF THE DRAWINGS

Features of the present disclosure are illustrated by way of example and not limited in the following figures, in which like numerals indicate like elements, in which.

DETAILED DESCRIPTIONS

For simplicity and illustrative purposes, the present disclosure is described by referring mainly to examples thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term 'includes' means 'includes but not limited to', the term "including" means 'including but not being limited to'. The term "based on" means 'based at least in part on'. The term 'comprising' as used in this specification and claims means 'consisting at least in part of'. When interpreting statements in this specification and claims which include the term 'comprising', other features besides the features prefaced by this term in each statement can also be present. Related terms such as 'comprise' and 'comprised' are to be interpreted in similar manner. Quantities of an element, unless specifically mentioned, may be one or a plurality of, or at least one.

Figure 1:
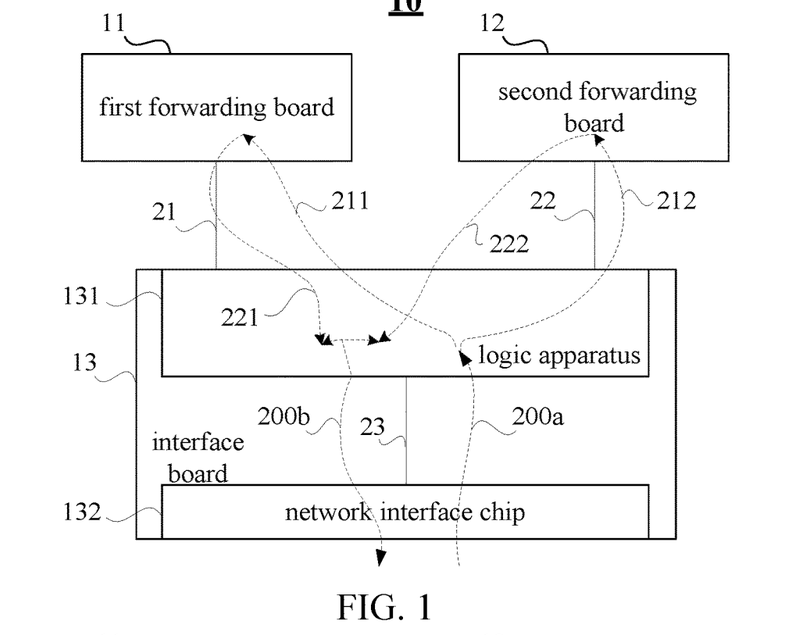
FIG. 1 is a schematic diagram illustrating an example of a network device.

As shown in FIG. 1, a network device 10 of an example may include:
a first forwarding board 11;
a second forwarding board 12; and
an interface board 13, which may include a control apparatus (also referred to as logic apparatus) 131 and a network interface chip 132. The control apparatus 131 may be connected to the first forwarding board 11 via a first I/O bus 21, connected to the second forwarding board 12 via a second I/O bus 22, and connected to the network interface chip 132 via a network interface bus 23.

The control apparatus 131 may form a first upstream packet flow 211 which is sent to the first forwarding board 11 through the first I/O bus 21 and a second upstream packet flow 212 which is sent to the second forwarding board 12 through the second I/O bus 22 using data packets 200a received through the network interface chip 132 from the exterior of the network device 10.

The control apparatus may select one of the first downstream packet flow 221 and the second downstream packet flow 222 according to the active/standby state of the first forwarding board 11 and the second forwarding board 12, and connect the selected packet flow to the network interface chip 132 through the network interface bus 23 so that the network interface chip 132 may send data packets 200b out of the network device 10, wherein the first downstream packet flow 221 is processed by the first forwarding board 11 and received through the first I/O bus 21, and the second downstream packet flow 222 is processed by the second forwarding board 12 and received through the second I/O bus 22.

The above "upstream" which is a direction of a packet flow may be regarded as a direction from the exterior of the network device 10 to the interior of the network device 10 (i.e., the ingress direction), or may be regarded as a direction from the interface board 13 to the first forwarding board 11 and the second forwarding board 12. Accordingly, the above "downstream" which is a direction of a packet flow may be regarded as a direction from the interior of the network device 10 to the exterior of the network device 10 (i.e., the egress direction), or may be regarded as a direction from the first forwarding board 11 and the second forwarding board 12 to the interface board 13. The "upstream" and "downstream" may refer to two directions opposite to each other, not absolute directions.

According to an example, the control apparatus 131 may use a copy of the data packets 200a as the first upstream packet flow 211, and use another copy of the data packets 200a as the second upstream packet flow 212. For example, when receiving a data packet, the control apparatus 131 may add the data packet to the first upstream packet flow 211 and to the second upstream packet flow 212 respectively.

In an example, the control apparatus 131 or modules of the control apparatus 131 may be implemented by dedicated hardware, e.g., dedicated circuitry or logic that is permanently configured (e.g., as a special-purpose processor, such as a field programmable gate array (FPGA) or an application-specific integrated circuit (ASIC)) to perform certain operations. In another example, the control apparatus 131 or modules of the control apparatus 131 may be implemented by hardware executing machine-readable instructions, e.g., programmable logic or circuitry (e.g., including a general-purpose processor or other programmable processor) that is temporarily configured by software to perform certain operations.

Figure 2A:
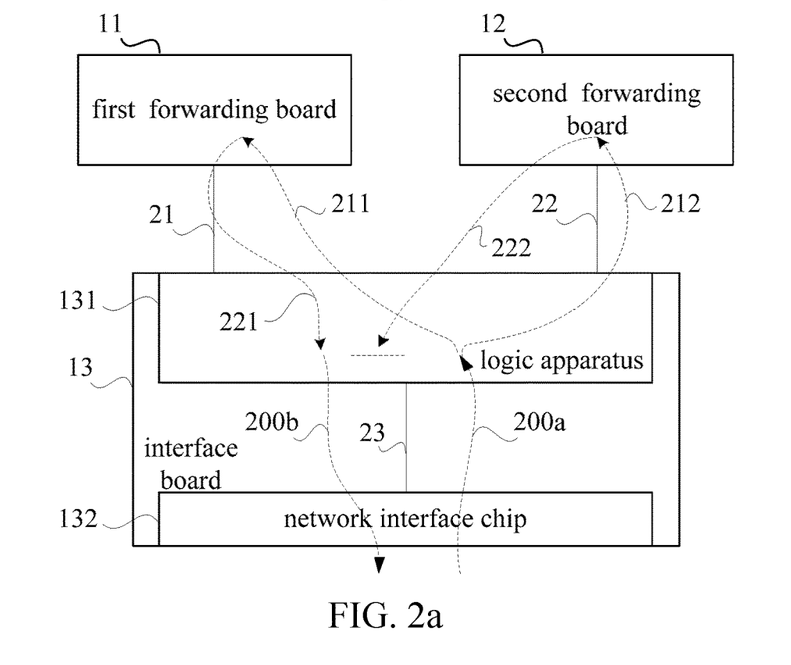
FIG. 2a and FIG. 2b are schematic diagrams each illustrating a working state of the network device as shown in FIG. 1.
Figure 2B:
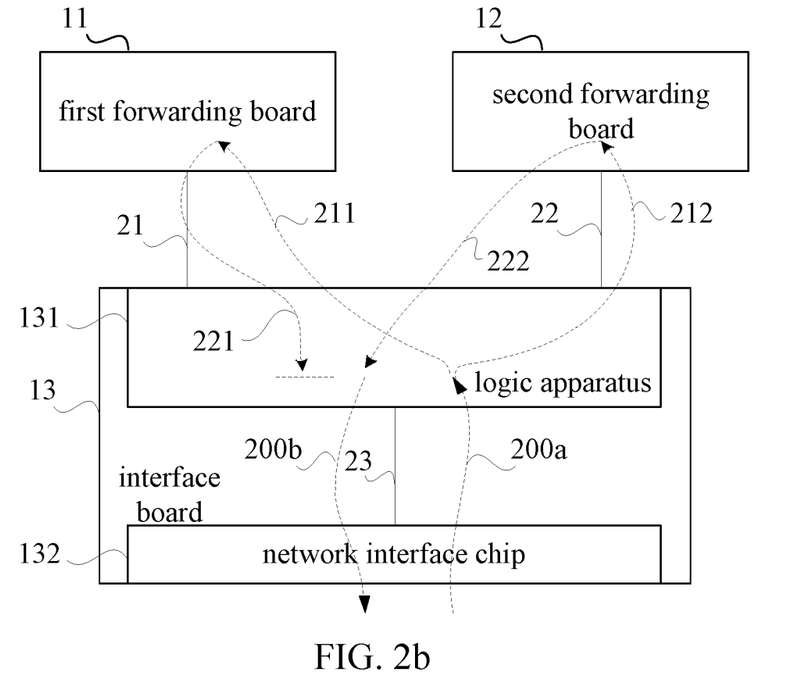

In the above examples, there may be two states as shown in FIG. 2a and FIG. 2b.

As shown in FIG. 2a, when the first forwarding board 11 is an active forwarding board and the second forwarding board 12 is a standby forwarding board, the control apparatus 131 may receive data packets 200a from the exterior of the network device 10 via the network interface chip 132, form the first upstream packet flow 211 which is sent through the first I/O bus 21 to the first forwarding board 11, and form the second upstream packet flow 212 which is sent through the second I/O bus 22 to the second forwarding board 12. The control apparatus 131 may connect the first downstream packet flow 221 which is received from the first forwarding board 11 to the network interface chip 132, and disconnect the second downstream packet flow 222 which is received from the second forwarding board 12 from the network interface chip 132. As such, the data packets 200b sent by the network interface chip 132 to the exterior of the network device 10 may be from the first downstream packet flow 221.

As shown in FIG. 2b, when the first forwarding board 11 is a standby forwarding board and the second forwarding board 12 is the active forwarding board, the control apparatus 131 may receive data packets 200a from the exterior of the network device 10 via the network interface chip 132, form the first upstream packet flow 211 which is sent through the first I/O bus 21 to the first forwarding board 11, and form the second upstream packet flow 212 which is sent through the second I/O bus 22 to the second forwarding board 12. The control apparatus 131 may disconnect the first downlink packet flow 221 which is received from the first forwarding board 11 from the network interface chip 132, and connect the second downlink packet flow 222 which is received from the second forwarding board 12 to the network interface chip 132. As such, the data packets 200b sent by the network interface chip 132 to the exterior of the network device 10 may be from the second downstream packet flow 222.

In the above examples, the second forwarding board 12 in the standby state as shown in FIG. 2a and the first forwarding board 11 in the standby state as shown in FIG. 2b both have normal forwarding capabilities. Therefore, there is the second downstream packet flow 222 in FIG. 2a, and there is the first downstream packet flow 221 in FIG. 2b. If the second forwarding board 12 in FIG. 2a and the first forwarding board 11 in FIG. 2b is switched to the standby state due to a failure, i.e., not being capable of performing forwarding in the egress direction of the network device 10, the second downstream packet flow 222 in FIG. 2a and the first downlink downstream packet flow 221 in FIG. 2b may not exist.

In the above examples, the interface board 13 may be connected to the first forwarding board 11 and the second forwarding board 12 respectively through the first I/O bus 21 and the second I/O bus 22. The first I/O bus 21 and the second I/O bus 22 are independent from each other. The data packets 200a received in the ingress direction by the network interface chip 132 of the interface board 13 may form the first upstream packet flow 212 which is sent to the first forwarding board 11 via the first I/O bus 21 and the second upstream packet flow 212 which is sent to the second forwarding board 12 via the second I/O bus 22.

Therefore, when the first forwarding board 11 and the second forwarding board 12 which are respectively in the active state and the standby state have normal forwarding capabilities, the first downstream packet flow 221 and the second downstream packet flow 222 respectively transmitted through the first I/O bus 21 and the second I/O bus 22 may exist at the same time. As such, downstream data packets may be forwarded by selectively connecting one of the first downstream packet flow 221 and the second downstream packet flow 222 to the network interface chip 132.

When active/standby switching of forwarding boards is needed, no physical switching operation is required for any of the first I/O bus 21 and the second I/O bus 22. Thus, physical switching operation of I/O buses and subsequent initiation process can be avoided, and the duration of traffic interruption caused by the active/standby switching can be reduced.

In addition, the first forwarding board 11 and the second forwarding board 12 in the examples may be boards having at least forwarding capabilities. The first forwarding board 11 and/or the second forwarding board 12 may also be integrated with functions such as control, computation, storage, or the like. In the above examples, boards having forwarding capabilities are referred to as forwarding boards, but forwarding boards may have functions other than forwarding.

When the first I/O bus 21 and the second I/O bus 22 in the above example may both be Peripheral Component Interconnect Express (PCI-E) buses, one end of a PCI-E bus may form a PCI-E root complex (RC) in a forwarding board, and another end of the PCI-E bus may form a PCI-E endpoint in the interface board. When a physical switching operation is performed on a PCI-E bus, a PCI-E endpoint of an interface board may be hot-unplugged from a PCI-E RC of a forwarding board and hot-plugged into a PCI-E RC of another forwarding board. The traffic interruption resulted from the process of hot-plugging in the newly-promoted active forwarding board may last on the order of 10 seconds. According to various examples of the present application, a physical switching operation on a PCI-E bus can be avoided, thus the traffic interruption can be reduced to the order of nanoseconds, and the duration of the traffic interruption can be remarkably shortened.

In the following examples, the first I/O bus and the second I/O bus are both PCI-E buses.

Figure 3:
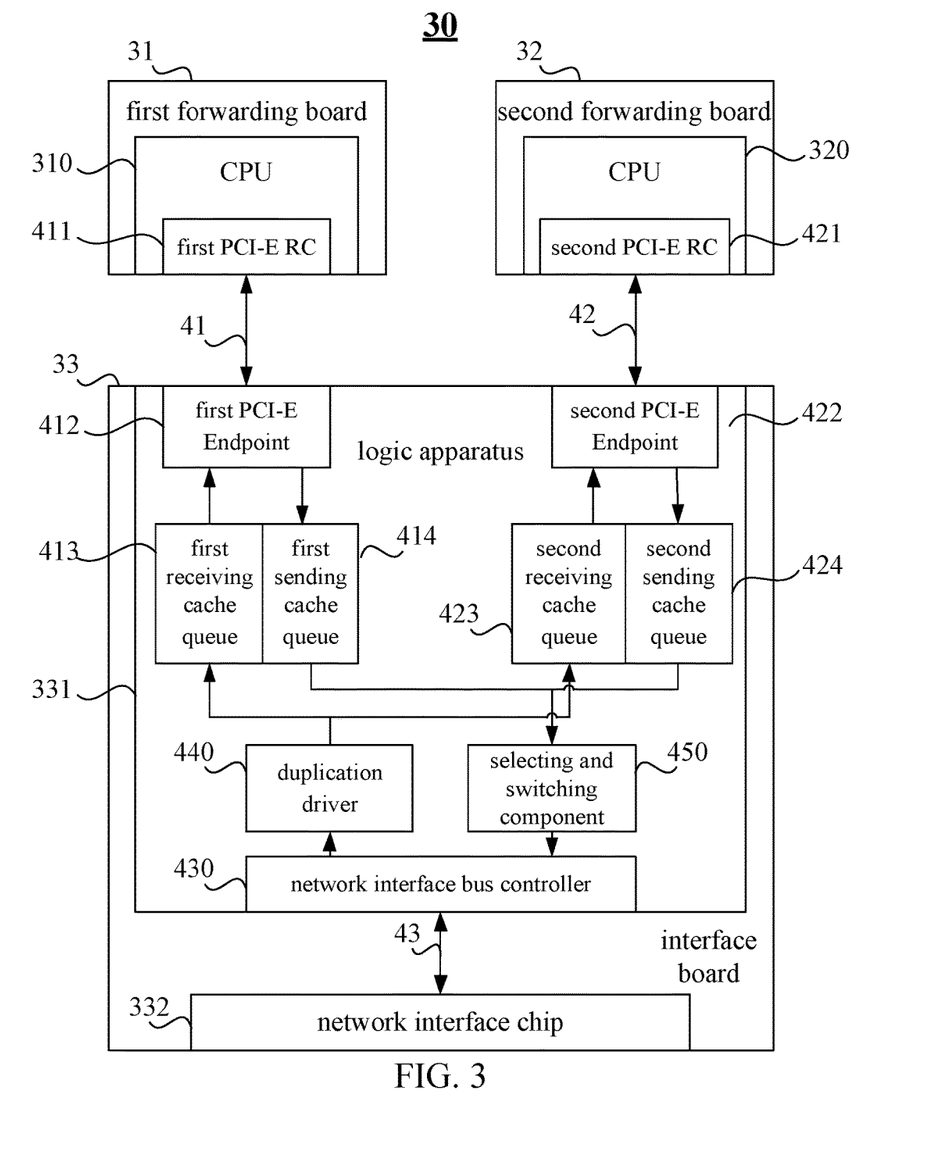
FIG. 3 is a schematic structure diagram illustrating a network device having PCI-E bus according to an example of the present disclosure.

As shown in FIG. 3, a network device 30 of an example may include: a first forwarding board 31, a second forwarding board 32 and an interface board 33.

The first forwarding board 31 may include a first PCI-E RC 411 connected to the first PCI-E bus 41, and a first CPU 310 for driving the first PCI-E RC 411. In the example of FIG. 3, the first PCI-E RC 411 may be integrated into the first CPU 310 of the first forwarding board 31. In other examples, the first PCI-E RC 411 may be standalone from the first CPU 310, and the first CPU 310 may be capable of driving the standalone first PCI-E RC 411.

The second forwarding board 32 may include a second PCI-E RC 421 connected to the second PCI-E bus 42, and a second CPU 320 for driving the second PCI-E RC 421. In the example of FIG. 3, the second PCI-E RC 421 may be integrated into the second CPU 320 of the second forwarding board 32. In other examples, the second PCI-E RC 421 may be standalone from the second CPU 320, and the second CPU 320 may be capable of driving the standalone second PCI-E RC 421.

Figure 4A:
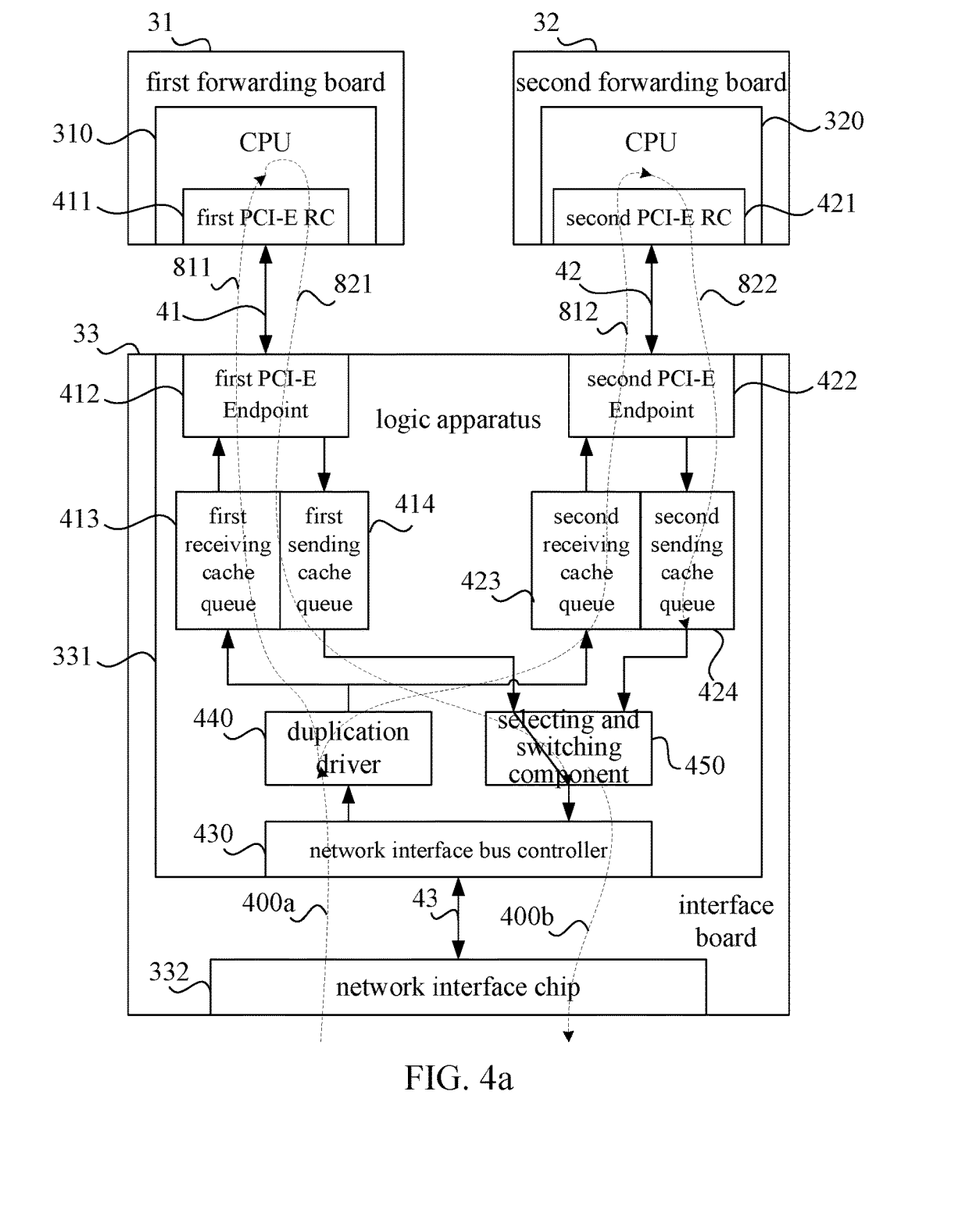
FIG. 4a and FIG. 4b are schematic diagrams each illustrating a working state of the network device as shown in FIG. 3.

The interface board 33 may include a control apparatus 331 and a network interface chip 332. The control apparatus 331 may be connected to the first forwarding board 31 through the first PCI-E bus 41, and connected to the second forwarding board 32 through the second PCI-E bus 42. The control apparatus 331 may include:

a first PCI-E endpoint 412 connected to the first PCI-E bus 41;

a second PCI-E endpoint 422 connected to the second PCI-E bus 42;

a first receiving cache queue 413 and a first sending cache queue 414 which are connected to the first PCI-E endpoint 412;

a second receiving cache queue 423 and a second sending cache queue 424 which are connected to the second PCI-E endpoint 422;

a network interface bus controller 430 connected to the network interface chip 332 through a network interface bus 43;

a duplication driver 440 which respectively connects the network interface bus controller 430 to the first receiving cache queue 413 and the second receiving cache queue 423; and a selecting and switching component 450 which selectively connects one of the first sending cache queue 414 and the second sending cache queue 424 to the network interface bus controller 430. As shown in FIG. 3 and FIG. 4a, when the first forwarding board 31 is an active forwarding board and the second forwarding board 32 is a standby forwarding board, the duplication driver 440 in the control apparatus 331 may generate copies of data packets 400a received through the network interface chip 332 from the exterior of the network device 30, and store the copies respectively into the first receiving cache queue 413 and the second receiving cache queue 423;

the first PCI-E endpoint 412 may read the first receiving cache queue 413 and send a first upstream packet flow 811 through the first PCI-E bus 41 to the first forwarding board 31 to have the first upstream packet flow 811 processed by the first CPU 310; the second PCI-E endpoint 422 may read the second receiving cache queue 423 and send a second upstream packet flow 812 through the second PCI-E bus 42 to the second forwarding board 32 to have the second upstream packet flow 812 processed by the second CPU 320;

the first PCI-E endpoint 412 may also receive a first downstream packet flow 821 which is processed by the first CPU 310 from the first forwarding board 31 through the first PCI-E bus 41, and feed the first downstream packet flow 821 into the first sending cache queue 414; the second PCI-E endpoint 422 may also receive a second downstream packet flow 822 which is processed by the second CPU 320 from the second forwarding board 32 through the second PCI-E bus 42, and feed the second downstream packet flow 822 into the first sending cache queue 424;

the selecting and switching component 450 may connect the first sending cache queue 414 to the network interface bus controller 430, and disconnect the second sending cache queue 424 from the network interface bus controller 430, so that the first downstream packet flow 821 in the first sending cache queue 414 may be read by the network interface bus controller 430 and sent to the network interface chip 332 via the network interface bus 43. As such, the data packets 400b sent by the network interface chip 332 in the egress direction of the network device 30 are from the first downstream packet flow 821.

Figure 4B:
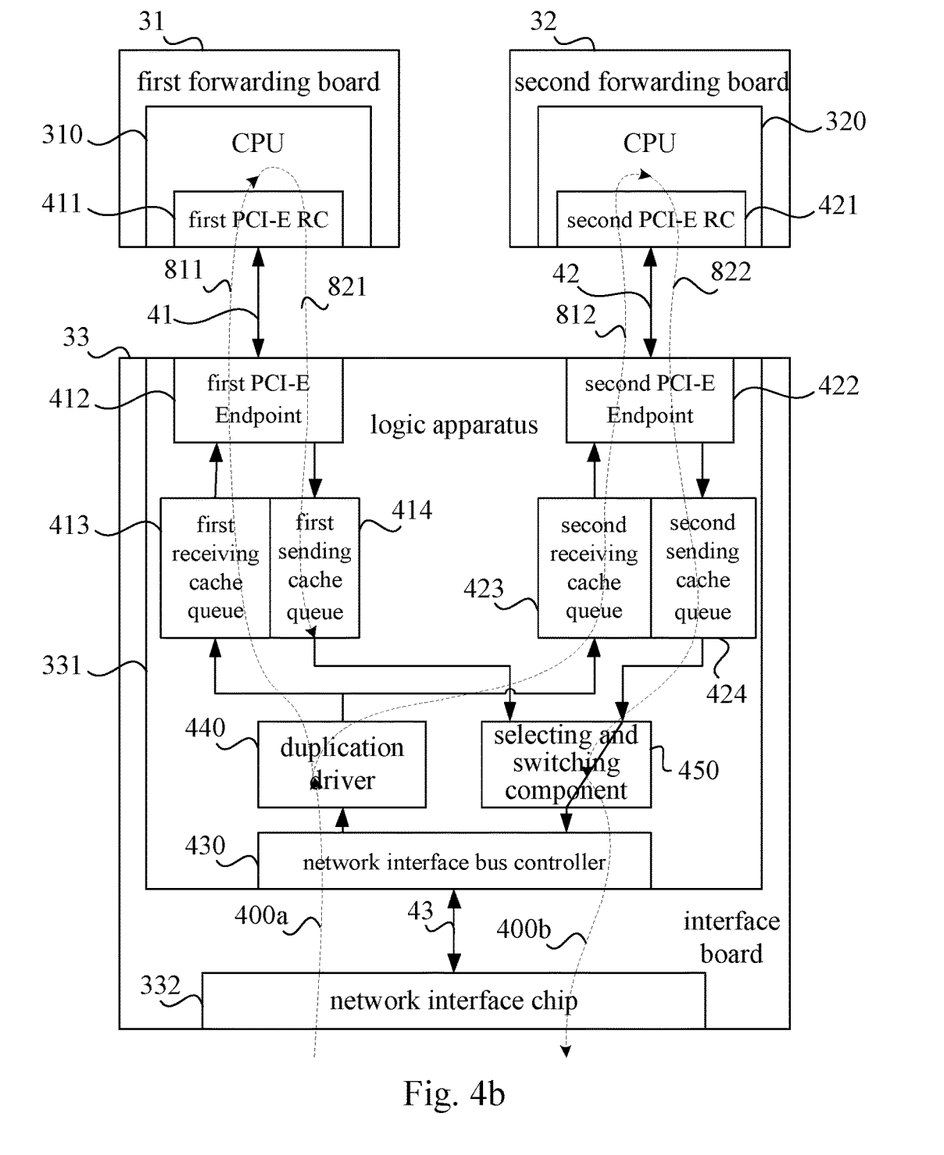

As shown in FIG. 3 and FIG. 4b, when the first forwarding board 31 is a standby forwarding board and the second forwarding board 32 is an active forwarding board, the duplication driver 440 in the control apparatus 331 may generate copies of data packets 400a received through the network interface chip 332 from the exterior of the network device 30, and store the copies respectively into the first receiving cache queue 413 and the second receiving cache queue 423;

the first PCI-E endpoint 412 may read the first receiving cache queue 413 and send a first upstream packet flow 811 through the first PCI-E bus 41 to the first forwarding board 31 to have the first upstream packet flow 811 processed by the first CPU 310; the second PCI-E endpoint 422 may read the second receiving cache queue 423 and send a second upstream packet flow 812 through the second PCI-E bus 42 to the second forwarding board 32 to have the second upstream packet flow 812 processed by the second CPU 320;

the first PCI-E endpoint 412 may also receive a first downstream packet flow 821 which is processed by the first CPU 310 from the first forwarding board 31 through the first PCI-E bus 41, and feed the first downstream packet flow 821 into the first sending cache queue 414; the second PCI-E endpoint 422 may also receive a second downstream packet flow 822 which is processed by the second CPU 320 from the second forwarding board 32 through the second PCI-E bus 42, and feed the second downstream packet flow 822 into the first sending cache queue 424;

the selecting and switching component 450 may disconnect the first sending cache queue 414 from the network interface bus controller 430, and connect the second sending cache queue 424 to the network interface bus controller 430, so that the second downstream packet flow 822 in the second sending cache queue 424 may be read by the network interface bus controller 430 and sent to the network interface chip 332 via the network interface bus 43. As such, the data packets 400b sent by the network interface chip 332 in the egress direction of the network device 30 are from the second downstream packet flow 822.

When the network device 30 is powered on and starts up, the active forwarding board may set up initial configurations in the interface board 13 in a board initiation process, e.g., board power-on, out of reset, board identification, or the like.

After the board initiation process, a PCI-E configuration process is carried out to configure the first PCI-E endpoint 412, the second PCI-E endpoint 422, the first receiving cache queue 413 and the first sending cache queue 414, the second receiving cache queue 423 and the second sending cache queue 424. The PCI-E configuration process may include endpoint function configuration according to the PCI-E protocol. The endpoint function configuration may be carried out in a PCI-E initiation process executed after the board initiation process.

The first PCI-E endpoint 412, the first receiving cache queue 413 and the first sending cache queue 414 which are monopolized by the first PCI-E bus 41 may be configured by the first CPU 310 through driving the first PCI-E RC 411 of the remote end of the first PCI-E bus 41. For example, the first receiving cache queue 413 and the first sending cache queue 414 may be mapped onto pre-determined space of the first PCI-E endpoint 412. The first PCI-E RC 411 may configure the first PCI-E endpoint 412 when being driven by the first CPU 310, so as to configure the first PCI-E endpoint 413, the first receiving cache queue 413 and the first sending cache queue 414.

The second PCI-E endpoint 422, the second receiving cache queue 423 and the second sending cache queue 424 which are monopolized by the second PCI-E bus 42 may be configured by the second CPU 320 through driving the second PCI-E RC 421 of the remote end of the second PCI-E bus 42. For example, the second receiving cache queue 423 and the second sending cache queue 424 may be mapped onto pre-determined space of the second PCI-E endpoint 422. The second PCI-E RC 421 may configure the second PCI-E endpoint 422 when being driven by the second CPU 320, so as to configure the second PCI-E endpoint 422, the second receiving cache queue 423 and the second sending cache queue 424.

After the PCI-E initial configuration process, the network interface configuration for the network interface bus controller 430 and the network interface chip 332 may be performed. The network interface configuration may be link layer configurations such as self-negotiation configuration, duplex or semi-duplex configuration, megabits or gigabits configurations, or the like.

The network interface bus controller 430 and network interface chip 332, which are shared by the first PCI-E bus 41 and the second PCI-E bus 42, may be configured by the PCI-E RC of an active forwarding board. For example, when the first forwarding board 31 is an active forwarding board, the network interface bus controller 430 and network interface chip 332 may be configured by the first CPU 310 through driving the first PCI-E RC 411. When the second forwarding board 32 is an active forwarding board, the network interface bus controller 430 and network interface chip 332 may be configured by the second CPU 320 through driving the second PCI-E RC 421

Figure 5:
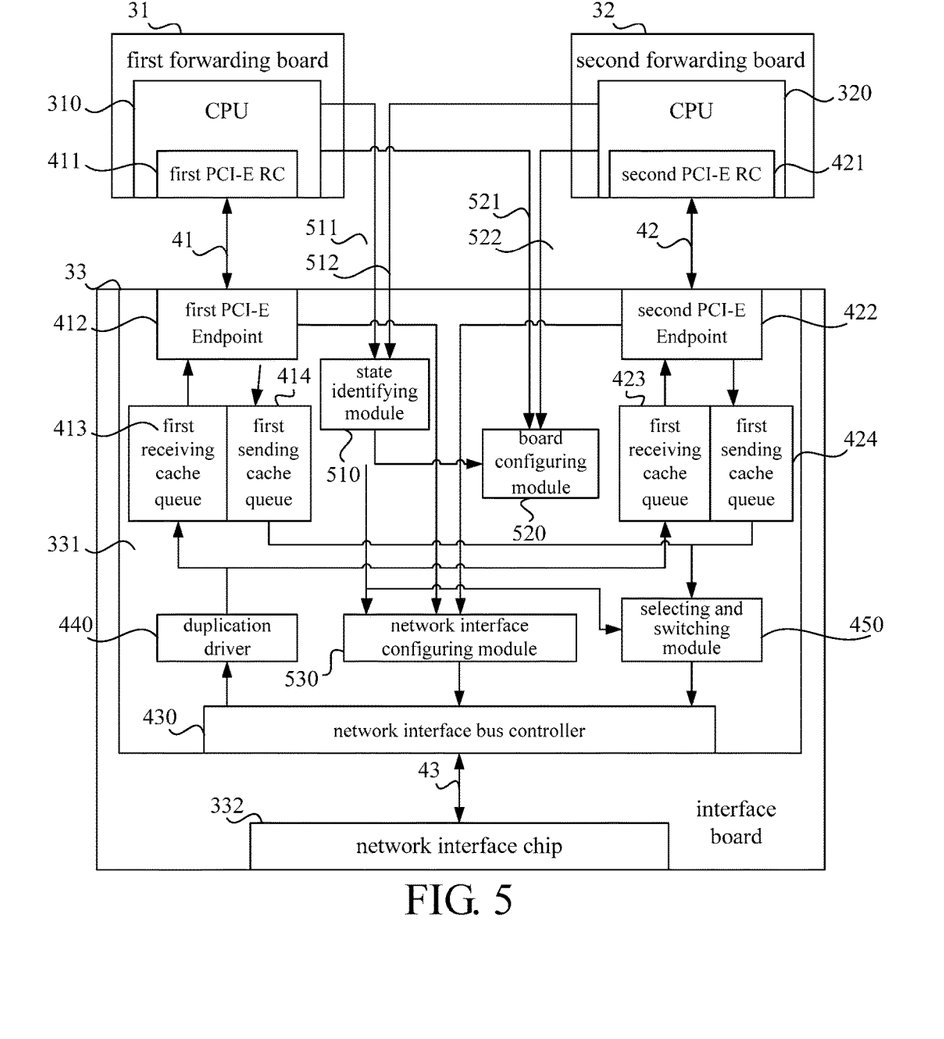
FIG. 5 is a schematic diagram illustrating an extended structure of the network device as shown in FIG. 3.

In some examples, the control apparatus 331 may also include: a state identifying module 510, a board configuration module 520, and a network interface configuration module 530.

The state identifying module 510 may be connected respectively to a control pin 511 of the first CPU 310 of the first forwarding board 31 and to a control pin 512 of the second CPU 320 of the second forwarding board 32, may identify an active/standby state of the first forwarding board 31 and the second forwarding board 32 by performing measurement at the control pin 511 and the control pin 512, and record the active/standby state for use by the selecting and switching component 450.

The board configuration module 520 may be connected to the first CPU 310 of the first forwarding board 31 through a first management bus 521 and connected to the second CPU 320 of the second forwarding board 32 through a second management bus 522, and may identify the active/standby state of the first forwarding board 31 and the second forwarding board 32 through the state identifying module 510. When the network device is powered on and starts up, the board configuration module 520 may receive board initial configurations of the interface board 33 from the first CPU 310 of the first forwarding board 31 through the first management bus 521 after identifying that the first forwarding board 31 is in an active state; or receive board initial configurations of the interface board 33 from the second CPU 320 of the second forwarding board 32 through the second management bus 522 after identifying that the second forwarding board 32 is in an active state.

The network interface configuration module 530 may identify the active/standby state of the first forwarding board 31 and the second forwarding board 32 through the state identifying module 510, receive initial configuration of the network interface bus controller 430 and the network interface chip 332 from the first CPU 310 through the first PCI-E RC 411 and the first PCI-E endpoint 412 after identifying that the first forwarding board 31 is in the active state, or receive initial configuration of the network interface bus controller 430 and the network interface chip 332 from the second CPU 320 through the second PCI-E RC 421 and the second PCI-E endpoint 422 after identifying that the second forwarding board 32 is in the active state. After performing initial configuration of the network interface bus controller 430, the network interface configuration module 530 may drive the network interface bus controller 430 to configure the network interface chip 332 through the network interface bus 43.

Besides the network device of the above examples, various examples also provide a method of forwarding packets in a network device. A network device executing the packet forwarding method may include an interface board having a network interface chip, a first forwarding board connected to the interface board through a first I/O bus, and a second forwarding board connected to the interface board through the second I/O bus.

Figure 6:
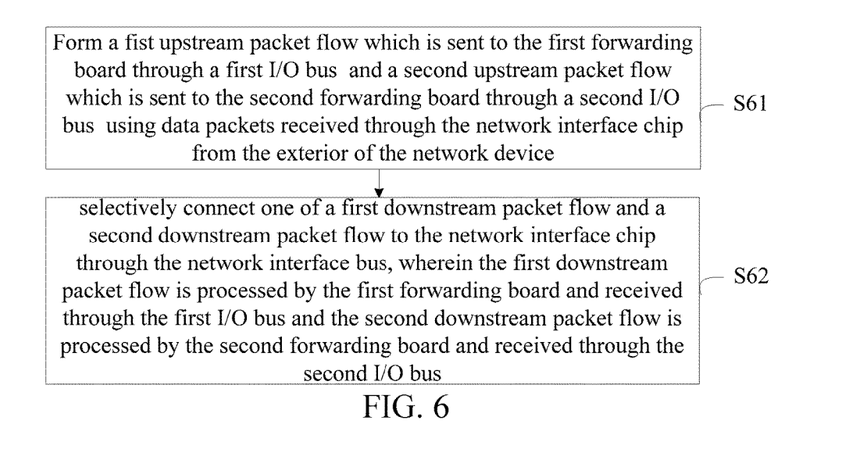
FIG. 6 is a schematic flowchart illustrating a packet forwarding method in a network device according to an example of the present disclosure.

As shown in FIG. 6, the packet forwarding method may include the following procedures performed by the interface board.

At S61, a first upstream packet flow which is sent to the first forwarding board through the first I/O bus and a second upstream packet flow which is sent to the second forwarding board through the second I/O bus may be formed using data packets 200*a* received through the network interface chip from the exterior of the network device.

At S62, one of a first downstream packet flow and a second downstream packet flow may be selected to be connected to the network interface chip through the network interface bus according to an active/standby state of the first forwarding board and the second forwarding board, wherein the first downstream packet flow is processed by the first forwarding board and received through the first I/O bus and the second downstream packet flow is processed by the second forwarding board and received through the second I/O bus.

In the network device executing the packet forwarding method, if the first I/O bus is a first PCI-E bus, the second I/O bus is a second PCI-E bus, the first forwarding board may include a first PCI-E RC connected to the first PCI-E bus and a first CPU for driving the first PCI-E RC;

the second forwarding board may include a second PCI-E RC connected to the second PCI-E bus and a second CPU for driving the second PCI-E RC;

the interface board may include a first PCI-E endpoint connected to the first PCI-E bus and a second PCI-E endpoint connected to the second PCI-E bus, a first receiving cache queue and a first sending cache queue which are connected to the first PCI-E endpoint, a second receiving cache queue and a second sending cache queue which are connected to the second PCI-E endpoint, and a network interface bus controller connected to the network interface chip via a network interface bus.

Accordingly, the packet forwarding method may duplicate a data packet received by the network interface bus controller from the network interface chip, and feed the copies of the data packet respectively into the first receiving cache queue and the second receiving cache queue to form the first upstream packet flow using the first receiving cache queue and form the second upstream packet flow using the second receiving cache queue.

The packet forwarding method may also selectively connect one of the first sending cache queue and the second sending cache queue to the network interface bus so that one of the first downstream packet flow and the second downstream packet flow is connected to the network interface chip through the network interface bus.

In an example, the packet forwarding method may also initiate the interface board of the network device, including board initial configuration, PCI-E initial configuration, and network interface configuration.

Figure 7:
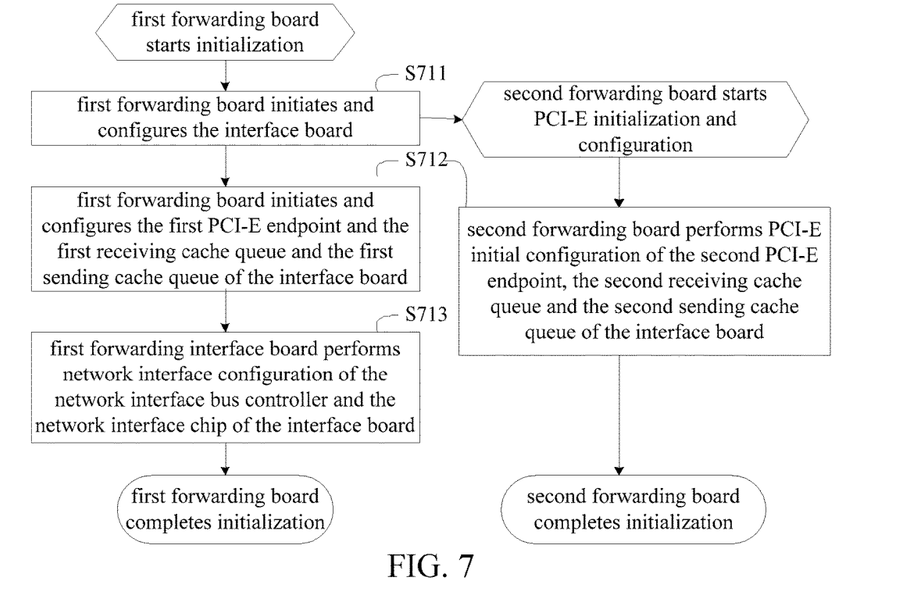
FIG. 7 is a schematic flowchart illustrating an initiation process of a network device according to an example of the present disclosure.

As shown in FIG. 7, in an example where the first forwarding board is in an active state and the second forwarding board is in a standby state during the initiation process after the network device is powered on and starts up, the initiation process may be initiated by the first forwarding board and may include the following procedures.

At S711, the first forwarding board may perform board initial configuration of the interface board, and instruct the second forwarding board to start PCI-E initial configuration after the board initial configuration is completed.

At S712, the first forwarding board may perform PCI-E initial configuration of the first PCI-E endpoint, the first receiving cache queue and the first sending cache queue in the interface board, and the second forwarding board may perform PCI-E initial configuration of the second PCI-E endpoint, the second receiving cache queue and the second sending cache queue in the interface board.

At S713, the first forwarding board may perform network interface configuration of the network interface bus controller and the network interface chip in the interface board.

The above procedures performed by the first forwarding board and the second forwarding board may be regarded as being carried out by the first CPU and the second CPU. The interface board may identify the active/standby state of the first forwarding board and the second forwarding board through a control pin of the first CPU in the first forwarding board and a control pin of the second CPU in the second forwarding board.

In order to carry out the board initial configuration in the initiation process as shown in FIG. 7, the packet forwarding method may receive board initial configuration of the interface board from the first CPU of the first forwarding board or the second CPU of the second forwarding board when the first forwarding board or the second forwarding board is in the active state.

The interface board may also be connected to the first CPU of the first forwarding board via a first management bus, and connected to the second CPU of the second forwarding board via a second management bus. The method may also include:

if the first forwarding board is in the active state, the board initial configuration of the interface board may be received from the first CPU of the first forwarding board through the first management bus;

if the second forwarding board is in the active state, the board initial configuration of the interface board may be received from the second CPU of the second forwarding board through the second management bus.

The PCI-E initial configuration as shown in FIG. 7 may include:

configuring the first PCI-E endpoint, the first receiving cache queue and the first sending cache queue by the first CPU through driving the first PCI-E RC;

configuring the second PCI-E endpoint, the second receiving cache queue and the second sending cache queue by the second CPU through driving the second PCI-E RC;

the network interface configuration may include: when the first forwarding board is an active forwarding board, initial configuration of the network interface bus controller and the network interface chip may be received from the first CPU via the first PCI-E RC; when the second forwarding board is an active forwarding board, initial configuration of the network interface bus controller and the network interface chip may be received from the second CPU via the second PCI-E RC It should be understood that in the above processes and structures, not all of the procedures and modules are necessary. Certain procedures or modules may be omitted according to the needs. The order of the procedures is not fixed, and can be adjusted according to the needs. The modules are defined based on function simply for facilitating description. In implementation, a module may be implemented by multiple modules, and functions of multiple modules may be implemented by the same module. The modules may reside in the same device or distribute in different devices. The "first", "second" in the above descriptions are merely for distinguishing two similar objects, and have no substantial meanings.

The scope of the claims should not be limited by the embodiments set forth in the examples, but should be given the broadest interpretation consistent with the description as a whole.

The invention claimed is:

1. A network device, comprising:
a first forwarding board;
a second forwarding board;
an interface board, comprising a control apparatus and a network interface chip, the control apparatus is connected to the first forwarding board via a first Input/Output (I/O) bus, connected to the second forwarding board via a second I/O bus, and connected to the network interface chip via a network interface bus;
wherein the control apparatus is to form a first upstream packet flow which is sent to the first forwarding board via the first I/O bus and a second upstream packet flow which is sent to the second forwarding board via the second I/O bus using data packets received through the network interface chip from exterior of the network device;
wherein the control apparatus is to select and connect one of a first downstream packet flow and a second downstream packet flow to the network interface chip through the network interface bus according to an active/standby state of the first forwarding board and the second forwarding board, wherein the first downstream packet flow is processed by the first forwarding board and received through the first I/O bus and the second downstream packet flow is processed by the second forwarding board and received through the second I/O bus,
wherein the first I/O bus is a first Peripheral Component Interconnect Express (PCI-E) bus, the second I/O bus is a second PCI-E bus; the first forwarding board comprises a first PCI-E root complex (RC) which is connected to the first PCI-E bus, and a first Central Processing Unit (CPU) capable of driving the first PCI-E RC; the second forwarding board comprises a second PCI-E root complex (RC) which is connected to the second PCI-E bus, and a second CPU capable of driving the second PCI-E RC; the control apparatus comprises:
a first PCI-E endpoint connected to the first PCI-E bus;
a second PCI-E endpoint connected to the second PCI-E bus;
a first receiving cache queue and a first sending cache queue which are connected to the first PCI-E endpoint;
a second receiving cache queue and a second sending cache queue which are connected to the second PCI-E endpoint;
a network interface bus controller connected to the network interface chip through the network interface bus;
a duplication driver which connects the network interface bus controller respectively to the first receiving cache queue and the second receiving cache queue, to form the first upstream packet flow using the first receiving cache queue, and form the second upstream packet flow using the second receiving cache queue; and
a selecting and switching component which selects and connects one of the first sending cache queue and the second sending cache queue to the network interface bus controller, to connect one of the first downstream packet flow and the second downstream packet flow to the network interface chip through the network interface bus.

2. The network device of claim 1, wherein
the first PCI-E endpoint, the first receiving cache queue and the first sending cache queue are configured by the first CPU through driving the first PCI-E RC during a PCI-E initiation process when the network device is powered on and starts up; and
the second PCI-E endpoint, the second receiving cache queue and the second sending cache queue are configured by the second CPU through driving the second PCI-E RC during the PCI-E initiation process when the network device is powered on and starts up.

3. The network device of claim 1, wherein the control apparatus further comprises:
a state identifying module, to record an active/standby state of the first forwarding board and the second forwarding board by using a control pin of the first CPU and a control pin of the second CPU; and
the selecting and switching component is further to connect the first downstream packet flow to the network interface chip through the network interface bus in response to a determination that the first forwarding board is an active forwarding board according to the active/standby state recorded by the state identifying module; to connect the second downstream packet flow to the network interface chip through the network interface bus in response to a determination that the second forwarding board is an active forwarding board according to the active/standby state recorded by the state identifying module, wherein the first downstream packet flow is processed by the first forwarding board and received through the first I/O bus and the second downstream packet flow is processed by the second forwarding board and received through the second I/O bus.

4. The network device of claim 3, wherein the control apparatus further comprises:
a network interface configuration module, to receive initial configuration of the network interface bus controller and the network interface chip from the first CPU via the first PCI-E RC during a network interface configuration process in response to a determination that the first forwarding board is an active forwarding board according to the active/standby state recorded by the state identification module; to receive initial configuration of the network interface bus controller and the network interface chip from the second CPU via the second PCI-E RC during a network interface configuration process in response to a determination that the second forwarding board is an active forwarding board according to the active/standby state recorded by the state identification module.

5. The network device of claim 3, wherein the control apparatus further comprises:
a board configuring module, connected to the first CPU through a first managing bus, connected to the second CPU through a second managing bus, to obtain initial configuration of the interface board from the first CPU via the first managing bus in response to a determination that the first forwarding board is an active forwarding board according to the active/standby state recorded by the state identifying module when the network device starts up, and to obtain initial configuration of the interface board from the second CPU via the second managing bus in response to a determination that the second forwarding board is an active forwarding board according to the active/standby state recorded by the state identifying module when the network device starts up.

6. A packet forwarding method in a network device, the network device comprising an interface board having a network interface chip, a first forwarding board connected to the interface board via a first Input/Output (I/O) bus, and a second forwarding board connected to the interface board via a second I/O bus, the method comprising: by the interface board,
forming a first upstream packet flow which is sent to the first forwarding board via the first I/O bus and a second upstream packet flow which is sent to the second forwarding board via the second I/O bus using data packets received through the network interface chip from the exterior of the network device; and
selectively connecting one of a first downstream packet flow and a second downstream packet flow to the network interface chip through the network interface bus according to an active/standby state of the first forwarding board and the second forwarding board, wherein the first downstream packet flow is processed by the first forwarding board and received through the first I/O bus and the second downstream packet flow is processed by the second forwarding board and received through the second I/O bus,
wherein the first I/O bus is a first Peripheral Component Interconnect Express (PCI-E) bus, the second I/O bus is a second PCI-E bus; the first forwarding board comprises a first PCI-E root complex (RC) connected to the first PCI-E bus, and a first Central Processing Unit (CPU) capable of driving the first PCI-E RC; the second forwarding board comprises a second PCI-E RC connected to the second PCI-E bus, and a second CPU capable of driving the second PCI-E RC; the interface board comprises a first PCI-E endpoint connected to the first PCI-E bus, a second PCI-E endpoint connected to the second PCI-E bus, a first receiving cache queue and a first sending cache queue which are connected to the first PCI-E endpoint, a second receiving cache queue and a second sending cache queue which are connected to the second PCI-E endpoint, and a network interface bus controller connected to the network interface chip via a network interface bus;

the method comprises: duplicating a data packet received by the network interface bus controller from the network interface chip, and feeding copies of the data packet respectively into the first receiving cache queue and the second receiving cache queue to form the first upstream packet flow using the first receiving cache queue and form the second upstream packet flow using the second receiving cache queue; and the method further comprises: selectively connecting one of the first sending cache queue and the second sending cache queue to the network interface bus so that the selected one of the first sending cache queue and the second sending cache queue is connected to the network interface chip through the network interface bus.

7. The packet forwarding method of claim 6, further comprising: during a PCI-E initiation process after the network device is powered on and starts up, driving, by the first CPU, the first PCI-E RC to configure the first PCI-E endpoint, the first receiving cache queue and the first sending cache queue; and driving, by the second CPU, the second PCI-E RC to configure the second PCI-E endpoint, the second receiving cache queue and the second sending cache queue.

8. The packet forwarding method of claim 6, further comprising:

identifying an active/standby state of the first forwarding board and the second forwarding board by using a control pin of the first CPU and a control pin of the second CPU, connecting the first downstream packet flow to the network interface chip through the network interface bus in response to a determination that the first forwarding board is an active forwarding board, and connecting the second downstream packet flow to the network interface chip through the network interface bus in response to a determination that the second forwarding board is an active forwarding board, wherein the first downstream packet flow is processed by the first forwarding board and received via the first I/O bus and the second downstream packet flow is processed by the second forwarding board and received via the second I/O bus.

9. The packet forwarding method of claim 8, further comprising: during a network interface configuration process, receiving initial configuration of the network interface bus controller and the network interface chip from the first CPU via the first PCI-E RC in response to a determination that the first forwarding board is an active forwarding board; receiving initial configuration of the network interface bus controller and the network interface chip from the second CPU via the second PCI-E RC in response to a determination that the second forwarding board is an active forwarding board.

10. The packet forwarding method of claim 8, further comprising: during startup of the network device, obtaining initial configuration of the interface board from the first CPU via the first managing bus in response to a determination that the first forwarding board is an active forwarding board; obtaining initial configuration of the interface board from the second CPU via the second managing bus in response to a determination that the second forwarding board is an active forwarding board.

* * * * *